United States Patent
Yamada et al.

(10) Patent No.: US 7,710,400 B2
(45) Date of Patent: May 4, 2010

(54) TOUCH PANEL HAVING A TRANSPARENT INSULATION FILM RESISTANT TO PEEL-OFF

(75) Inventors: Shinya Yamada, Kyoto (JP); Takao Hashimoto, Kyoto (JP); Yasuji Kusuda, Kyoto (JP); Daisuke Miura, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 721 days.

(21) Appl. No.: 10/544,929

(22) PCT Filed: Feb. 12, 2004

(86) PCT No.: PCT/JP2004/001448

§ 371 (c)(1),
(2), (4) Date: Aug. 10, 2005

(87) PCT Pub. No.: WO2004/072841

PCT Pub. Date: Aug. 26, 2004

(65) Prior Publication Data

US 2006/0132450 A1    Jun. 22, 2006

(30) Foreign Application Priority Data

Feb. 12, 2003   (JP) .............................. 2003-033653

(51) Int. Cl.
G09G 5/00 (2006.01)
(52) U.S. Cl. ...................... 345/173; 345/104
(58) Field of Classification Search .............. 345/173, 345/156, 179, 178, 104; 216/58
See application file for complete search history.

(56) References Cited

U.S. PATENT DOCUMENTS 6,304,251 B1 * 10/2001 Ito et al. ..................... 345/173

| | | | |
|---|---|---|---|
| 2002/0024498 A1 * | 2/2002 | Vos et al. | 345/156 |
| 2002/0101399 A1 | 8/2002 | Kubo et al. | |
| 2004/0233175 A1 * | 11/2004 | Chuang | 345/173 |
| 2004/0263482 A1 * | 12/2004 | Goertz | 345/173 |

FOREIGN PATENT DOCUMENTS

| | | |
|---|---|---|
| JP | 64-076109 | 3/1989 |
| JP | 3-37055 | 8/1991 |
| JP | 3018780 | 11/1995 |
| JP | 2587975 | 12/1996 |
| JP | 10-027063 | 1/1998 |

(Continued)

OTHER PUBLICATIONS

Supplementary Search Report issued Oct. 20, 2008 in corresponding European Patent Application No. 04 71 0507.

*Primary Examiner*—Amare Mengistu
*Assistant Examiner*—Yuk Chow
(74) *Attorney, Agent, or Firm*—Wenderoth, Lind & Ponack, L.L.P.

(57) ABSTRACT

A touch panel having a film/glass structure includes an upper electrode member including a transparent insulation film having upwardly-inclined end surfaces at each entire peripheral side. A touch panel having a film/film structure includes an upper electrode member including a transparent insulation film and a lower electrode member including a transparent insulation film, wherein the transparent insulation film and the transparent insulation film have upwardly-inclined end surfaces at each entire peripheral side.

8 Claims, 9 Drawing Sheets

FOREIGN PATENT DOCUMENTS

| | | |
|---|---|---|
| JP | 2000-20226 | 1/2000 |
| JP | 2001/127024 | 5/2001 |
| JP | 2002-278701 | 9/2002 |
| JP | 2002-287901 | 10/2002 |
| JP | 2003/006950 | 1/2003 |
| WO | 99/63394 | 12/1999 |

* cited by examiner

TOUCH PANEL HAVING A TRANSPARENT INSULATION FILM RESISTANT TO PEEL-OFF

BACKGROUND OF THE INVENTION

1. Field of the Invention

The present invention relates to a touch panel which is (i) less prone to peeling-off of a transparent insulation film during handling operations or during storage in a rack and (ii) capable of reducing the number of times that a mechanism is stopped during storage in the rack using the mechanism.

2. Background of the Related Art

Conventionally, there are touch panels installed on the display screens of LCDs (liquid crystal displays) or CRTs (cathode-ray tubes) connected to computers for enabling a person to press thereon with a finger or a pen according to instructions displayed on the seen-through display screen for inputting the pressed positions within the display screen to the computer. Transparent-electrode type (resistance-film type) touch panels which are most common include two types of touch panels, which are digital (matrix) type touch panels that detect certain matrix-shaped coordinates and analog-type touch panels that detect arbitrary coordinates. These two types of touch panels are used for different applications, and, for example, digital type touch panels are used for menu inputting while analog type touch panels are used for inputting graphics and manually-written letters. Any of the digital type and analog type touch panels may have a film/glass structure or a film/film structure.

Figure 13:
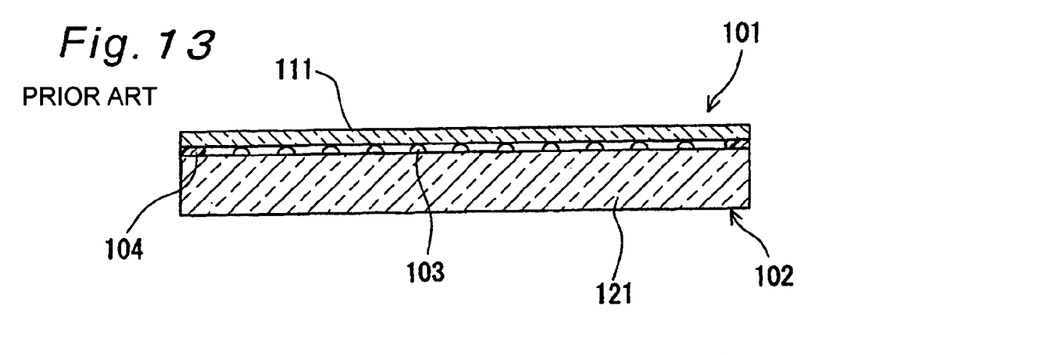
FIG. 13 is a cross sectional view illustrating one example of a conventional touch panel having a film/glass structure.

Referring to FIG. 13, a touch panel having a film/glass structure includes an upper electrode member 101 consisting of a transparent insulation film 111 and a transparent electrode on the lower surface thereof and a lower electrode member 102 consisting of a glass plate 121 and a transparent electrode on the upper surface thereof. The upper electrode member 101 and the lower electrode member 102 are attached to each other at their peripheral edges with cohesive agent or a double-sided tape 104. In the respective drawings, illustration of the transparent electrodes is omitted and the film materials and the glass material which are laminated are simply illustrated for ease of understanding.

Figure 17:
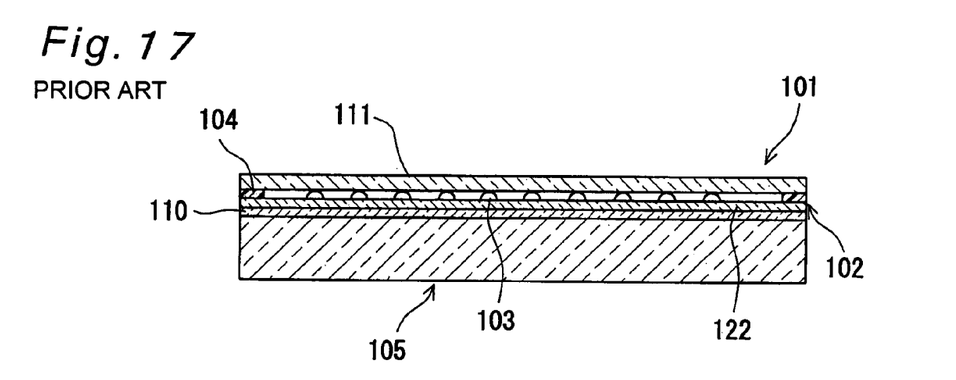
FIG. 17 is a cross sectional view illustrating one example of a conventional touch panel having a film/film structure.

Referring to FIG. 17, a touch panel having a film/film structure includes an upper electrode member 101 consisting of a transparent electrode on the lower surface of a transparent insulation film 111, a lower electrode member 102 consisting of a transparent electrode on the upper surface of a transparent insulation film 122, and a glass plate (transparent supporting plate) 105 adhered to the entire lower surface of the lower electrode member 102.

The aforementioned film/glass structure and film/film structure are disclosed in, for example, Japanese Patent No. 2587975 and Japanese Examined Utility Model Publication No. 3-37055.

However, the conventional touch panels include the transparent insulation film 111, 122 and the glass plates 121, 105 having end surfaces which are perpendicularly cut with respect to the surfaces of the respective members and, thus, have issues as follows.

Figure 14:
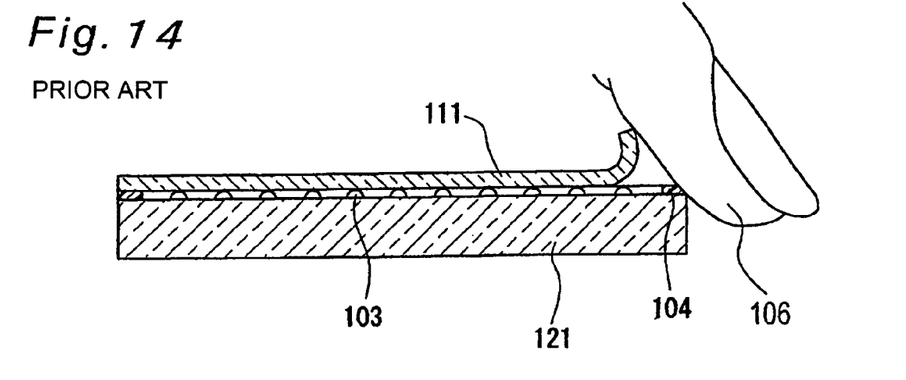
FIG. 14 is a view explaining issues caused during handling in the prior art.

(1) First, referring to FIG. 14, there is an issue that the transparent insulation film 111 is accidentally peeled off during handling operations of the touch panel, resulting in occurrences of defective products. When the touch panel is manually treated, the end surfaces of two parallel sides of the touch panel are sandwiched by fingers in order to prevent finger prints from being adhered to the inputting region, and it is difficult to always press the fingers 106 perpendicularly to the end surfaces. Particularly, larger-sized touch panels tend to cause the aforementioned issue. When a finger is obliquely pressed against an end surface of the transparent insulation film 111 of the touch panel, the upper portion of the end surface of the transparent insulation film is compressed and if the compression can not be further advanced any more, the lower portion of the end surface of the transparent insulation film 111 will be floated, namely peeled off.

Furthermore, if a finger is obliquely pressed against an end surface of the transparent insulation film of the touch panel during handling operations of the touch panel, causing the upper portion of the end surface of the transparent insulation film to be compressed, then the cohesive agent 104 may be compressed and thus extruded outwardly from between the upper electrode member 101 and the lower electrode member 102.

In the case of a double-sided tape, since a cohesive agent 104 is applied to the surface of a core material, the cohesive agent 104 of the double-sided tape may be similarly compressed and thus extruded outwardly from between the upper electrode member 101 and the lower electrode member 102. If the extruded cohesive agent 104 is adhered to the finger 106, the cohesive agent may be transferred to the surface or the back surface of the touch panel 108 when the finger 106 touches the touch panel subsequently.

Figure 15:
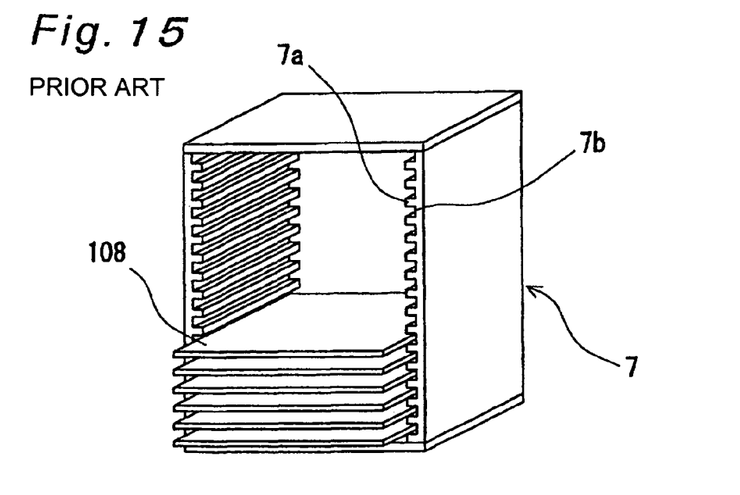
FIG. 15 is a perspective view explaining the storage of the touch panel in a rack.

Further, if the extruded cohesive agent 104 is adhered to a pressing tool for storing the touch panel 108 into a rack 7, as illustrated in FIG. 15, after the aforementioned handling operations, the adhered substance may be removed from the pressing tool and then may be transferred to the surface or the back surface of another touch panel 108 within the rack 7 during repeated storing using this pressing tool.

The cohesive agent being transferred to the surface or the back surface of the touch panel 108 will cause issues in terms of the following points.

Viewability

Inputting characteristics (when adhesive agent is adhered to the surface)

The former issue of "viewability" is described in that adhered substances obstruct the see-through view to degrade the viewability of the display, since the touch panel is installed on a display device such as an LCD for enabling inputting while seeing through the display.

Further, the latter issue of "inputting characteristics" is described in that adhered substances degrade the smoothness of the inputting surface. Thus, degrading the writing comfort when the tip end of an inputting pen is slid along the touch panel surface for writing letters or the like using the inputting pen. Namely, the pen cannot move along the touch panel in a smooth manner, preventing accuracy of a desired input. This problem is a lethal blow to touch panels.

(2) Further, when the touch panel is transferred using a robot hand after the aforementioned handling operations, the extruded adhesive agent 104 may make it difficult to separate the chuck of the robot hand from the touch panel. In such cases, the touch panel is moved to a position different from the intended position. For example, the touch panel may fall onto a floor or the like, resulting in a fracture of the touch panel.

(3) Further, there has recently been a trend toward narrower peripheral edges of touch panels, requiring double-sided tape, etc., to have narrow widths. Therefore, if the extruded adhesive agent 104 is adhered to a finger 106, a pressing tool, or the like, the touch panel may be completely transferred to the finger 106, the pressing tool, or the like.

In such cases, the partition for attaching the upper electrode member 101 and the lower electrode member 102 of the touch panel to each other at their peripheral edges and for separating the inside (the air layer between the electrodes) of the touch panel from the outside of the touch panel is partially lost, causing the following issues:

Occurrences of Newton's rings

Operational malfunctions

The "occurrences of Newton's rings" are described in that the air layer cannot generate repulsion forces against deformation of the upper electrode member 101 since the aforementioned partition-lost portion allows air to enter or exit, and as a result of repeated inputting, the upper electrode member 101 is sagged.

The latter issue of "operational malfunctions" includes two cases. The first case occurring where the aforementioned partition-lost portion allows moisture to enter the inside (the air layer between the electrodes) of the touch panel to degrade metal portions, causing operational malfunctions. Further, the second case occurring where the aforementioned partition-lost portion allows foreign substances to enter the inside (the air layer between the electrodes) of the touch panel to establish electrical conduction between the electrodes, causing operational malfunctions.

Figure 16:
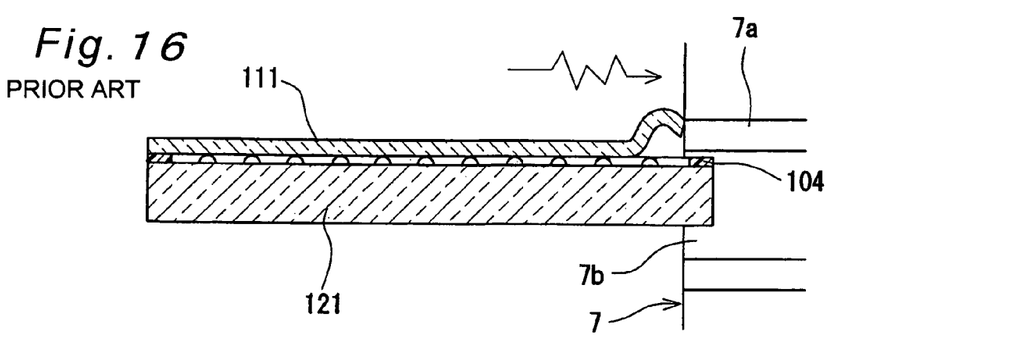
FIG. 16 is a view explaining issues caused during the storage of the touch panel in a rack in the prior art.

(4) Further, when the touch panel 108 is stored on the rack 7, there is an issue of peeling-off of the transparent insulation film 111. Storing of the touch panel 108 into respective stages of a rack 7 is performed by inserting the parallel two sides of the touch panel 108 in the depthwise direction along the horizontally-cut slots 7b on the inner sides of the side plates of the rack 7 (see FIG. 15), and the tip end portion of the touch panel 108 tends to contact with a shelf 7a of the rack 7 at each insertion opening of the rack 7 since the width of the slots 7b is narrow. Consequently, if the touch panel 108 is butted against a shelf 7a of the rack 7 at only an end surface of the transparent insulation film 111, the members below the transparent insulation film 111 will be inserted into the slot 7b of the rack 7 while the transparent insulation film 111 will be halted outside of the insertion opening, causing peeling-off thereof (see FIG. 16).

Furthermore, when the touch panels 108 are successively stored into respective stages of the rack 7 by a mechanism, even if an end surface of the transparent insulation film 111 is butted against a shelf 7a of the rack 7 at a single stage, the insertion cannot be further continued from then on or the mechanism can not be ready in time for the next insertion, causing the mechanism to be stopped.

These are issues specific to touch panels.

Therefore, it is an object of the present invention to provide touch panels which are less prone to peeling-off of transparent insulation films during handling operations or during storage in a rack, and are capable of reducing the number of times that the mechanism is stopped during storing into a rack with the mechanism, by overcoming the aforementioned issues.

BRIEF DESCRIPTION OF THE INVENTION

In accomplishing the above object, according to a first aspect of the present invention, there is provided a touch panel comprising:

an upper electrode member having a transparent electrode on a lower surface of a transparent insulation film; and a lower electrode member having a transparent electrode on an upper surface of a glass plate;

wherein the transparent insulation film of the upper electrode member has, in an entire peripheral edge thereof, an inclined end surface which is inwardly inclined from a bottom toward a top thereof.

According to a second aspect of the present invention, there is provided a touch panel comprising:

an upper electrode member having a transparent electrode on a lower surface of a transparent insulation film;

a lower electrode member having a transparent electrode on an upper surface of a transparent insulation film; and a transparent supporting plate of a glass plate adhered to an entire lower surface of the lower electrode member;

wherein the transparent insulation film of the upper electrode member and the transparent insulation film of the lower electrode member have, in entire peripheral edges thereof, inclined end surfaces which are inwardly inclined from the bottom toward the top thereof. The transparent insulation film of the upper electrode member is placed on the upper surface of the transparent insulation film of the lower electrode member other than the inclined end surfaces.

According to a third aspect of the present invention, there is provided the touch panel according to the first aspect, wherein end surface of the transparent insulation film of the upper electrode member at the entire peripheral edge thereof is inwardly recessed with respect to the end surfaces of the glass plate of the lower electrode member at an entire peripheral edge thereof to form recessed portions.

According to a fourth aspect of the present invention, there is provided the touch panel according to the first aspect, wherein end surfaces of the transparent insulation film of the lower electrode member at the entire peripheral edge thereof is inwardly recessed with respect to end surfaces of the transparent supporting plate made of the glass plate at the entire peripheral edge thereof to form recessed portions.

According to a fifth aspect of the present invention, there is provided the touch panel according to any one of the third and fourth aspects, wherein the recessed portions have a width within a range of 0.1 to 1.5 mm.

According to a sixth aspect of the present invention, there is provided the touch panel according to any one of the first to fifth aspects, wherein an acute angle $\theta$ formed between a normal line to the inclined end surface and a vertical axis is within a range of 35 to 75 degrees.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Hereinafter, touch panels according to embodiments of the present invention will be described in detail, with reference to the drawings.

Figure 1:
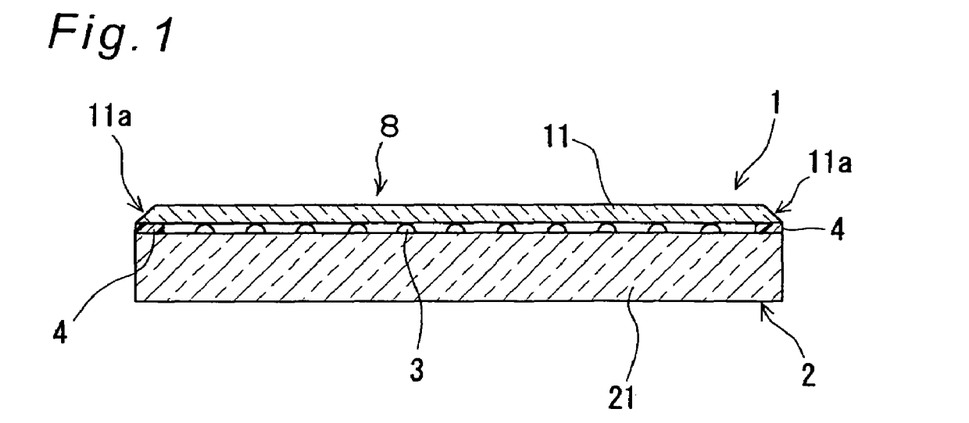
FIG. 1 is a cross sectional view illustrating a touch panel having a film/glass structure according to a first embodiment of the present invention.

A touch panel 8 illustrated in FIG. 1 according to a first embodiment of the present invention. The touch panel 8 has a film/glass structure including a transparent upper electrode member 1 having a rectangular-plate shape, for example, and a transparent lower electrode member 2 having a rectangular-plate shape, for example, which are opposed to each other with a plurality of transparent spacers 3 interposed therebetween and adhered to each other at their peripheral edges. The upper electrode member 1 is constituted by a transparent insulation film 11 having, for example, a rectangular shape and a transparent electrode on the lower surface of the transparent insulation film 11, the lower electrode member 2 is constituted by a glass plate 21 having, for example, a rectangular shape and a transparent electrode on the upper surface of the glass plate 21, and the transparent insulation film 11 of the aforementioned upper electrode member 1 has upwardly inclined end surfaces 11a which are inclined inwardly from the bottom thereof toward the top thereof throughout the entire peripheral sides thereof.

The transparent insulation film 11 used in the upper electrode member 1 may be a film made of an engineering plastic such as polycarbonate-based plastic, polyamide-based plastic, or polyetherketone-based plastic; or made of resin such as acrylic-based resin, a polyethylene-terephthalate-based resin, or polybutyleneterephthalate-based resin. Further, a hard coating layer may be formed on the upper surface of the transparent insulation film 11 of the upper electrode member 1. The hard coating layer may be made of an inorganic material such as a siloxane-based resin or an organic material such as an acrylic-epoxy-based heat-curing resin, a urethane-based heat-curing resin, or an acrylate-based photo-curing resin. Also, a non-glare treatment for preventing light reflection may be applied to the upper surface of the transparent insulation film 11 of the upper electrode member 1. For example, a pebbling process may be applied thereto or extenders or fine particles made of silica, alumina, or the like may be mixed in the hard coating layer. Further, the transparent insulation film 11 of the upper electrode member 1 may be a laminated-film member constructed by plural laminated films, instead of a single film.

The glass plate 21 used in the lower electrode member 2 may be made of soda glass, borosilicate glass, toughened glass, etc.

The first embodiment of the present invention is characterized in that the transparent insulation film 11 of the aforementioned upper electrode member 1 has the upwardly-inclined end surfaces 11a at the entire peripheral sides thereof, in the touch panel 8 having the film/glass structure. Even when a finger is obliquely pressed against an end surface of the transparent insulation film 11 of the touch panel 8 during handling operations of the tough panel 8, this structure prevents the upper portion of the end surface of the transparent insulation film 11 from being significantly compressed (see FIG. 3). Consequently, the lower portion of the end surface of the transparent insulation film 11 will not be floated. Thus, preventing peeling-off.

Further, the cohesive agent 4 will not be compressed and therefore will not be extruded outwardly from between the upper electrode member 1 and the lower electrode member 2, which prevents the cohesive agent 4 from being adhered to the finger, a pressing tool, or a robot hand, eliminating the risk of transfer thereof to the surface or the back surface of the touch panel 8. This can prevent degradation of the viewability and the input characteristics due to extruded cohesive agent 4 and also can prevent increases of the difficulty of separating the chuck of a robot hand from the touch panel 8 due to extruded cohesive agent 4, which can prevent the touch panel 8 from accidentally falling onto the floor, etc., resulting in fractures of the touch panel 8. Furthermore, this can prevent the touch panel 8 from being completely transferred to the finger, the pressing tool, or the like due to extruded cohesive agent 4, preventing occurrences of Newton's rings and operational malfunctions.

Figure 4:
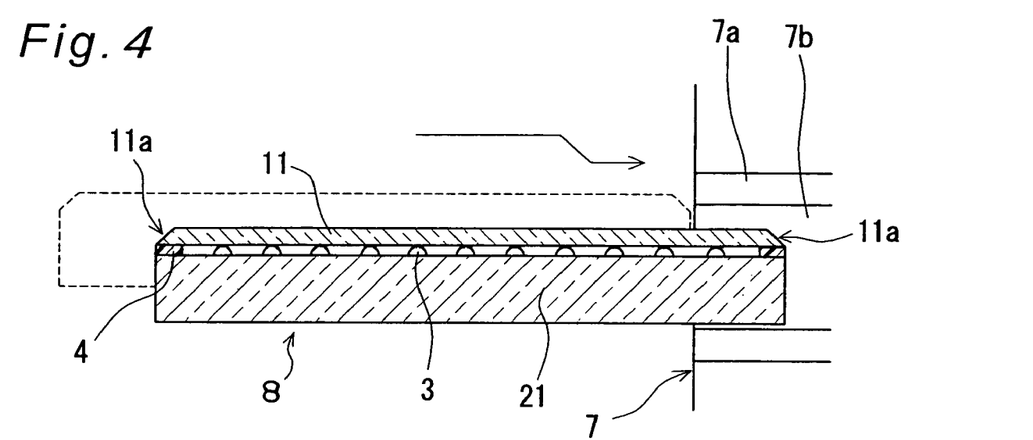
FIG. 4 is a view explaining the effects resulting from storing the touch panel of FIG. 1 in a rack.

Further, since the transparent insulation film 11 of the upper electrode member 1 has the upwardly-inclined end surfaces 11*a* at the entire peripheral sides thereof, even if the touch panel is nearly butted against a shelf 7*a* of a rack 7 only at an end surface of the transparent insulation film 11 during storing of the touch panel 8 into the rack 7, the entire touch panel 8 is flowed obliquely downward and forward along the aforementioned inclined end surface 11*a*, thus being prevented from butting thereto (see FIG. 4). This can prevent only the transparent insulation film 11 from being halted outside the insertion opening, which prevents peeling-off thereof.

Further, even when touch panels 8 are successively stored into respective stages of the rack 7 using a mechanism, the end surfaces of the transparent insulation film 11 is prevented from butting against the shelves 7*a* of the rack as previously described, which reduces the number of times that the mechanism is stopped.

Figure 5:
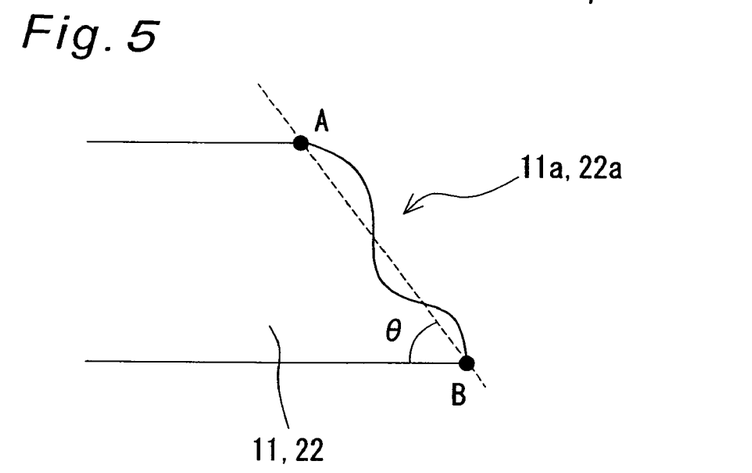
FIG. 5 is a view explaining an inclined end surface of the touch panel according to the present invention.

Further, it is preferable that the aforementioned inclined end surface 11*a* are formed to be cut planes of the transparent insulation film 11 and the acute angle θ (inclination angles θ) between normal lines to the inclined surfaces 11*a* and a vertical line is within the range of 35 to 75 degrees. If the inclination angle θ is smaller than 35 degrees, the cutting of the transparent insulation film 11 will be difficult. On the other hand, if the inclination angle θ is greater than 75 degrees, it will become difficult to offer the aforementioned effects of the inclined end surfaces 11*a*. A more preferable range of the inclination angle θ of the inclined end surfaces is from 40 to 70 degrees. By setting the inclination angle θ to equal to or more than 40 degrees, it is possible to certainly avoid the difficulty of cutting the transparent insulation film 11. On the other hand, by setting the inclination angle θ to equal to or less than 70 degrees, it is possible to certainly offer the aforementioned effects of the inclined end surfaces 11*a*. Further, the aforementioned inclined end surfaces 11*a* are not limited to flat surfaces and include non-flat surfaces having a tendency of exhibiting the inclination angle θ in all. In such cases, as illustrated in FIG. 5, the angle formed between the film lower surface and the line (the broken line in the figure) connecting between the cut-plane turning-point A at the film upper surface and the cut-plane turning-point B at the film lower surface is defined as the inclination angle θ.

While each of the upper electrode member 1 and the lower electrode member 2 is provided with a single transparent electrode as aforementioned in the case of an analog-type touch panel, each of the upper electrode member 1 and the lower electrode member 2 is provided with plural strap-shaped patterns in the case of a digital-type touch panel. The transparent electrodes may be formed from: metal oxide films made of tin oxide, indium oxide, antimony oxide, zinc oxide, cadmium oxide, indium tin oxide (ITO), or the like; composite films mainly consisting of these metal oxides; or metal films made of gold, silver, copper, tin, nickel, aluminum, palladium, or the like. Also, the transparent electrodes may be multi-layer films consisting of two or more layers. These transparent conductive films constituting the transparent electrodes may be formed by vacuum deposition, sputtering, ion plating, a CVD method, or the like. The transparent conductive films may be patterned by applying an etching process with an acid or the like used, for eliminating unnecessary portions other than the portions to be used as the transparent electrodes. Also, the portions of the transparent conductive films other than the portions to be used as the transparent electrodes may be coated with an insulation coating.

Figure 8:
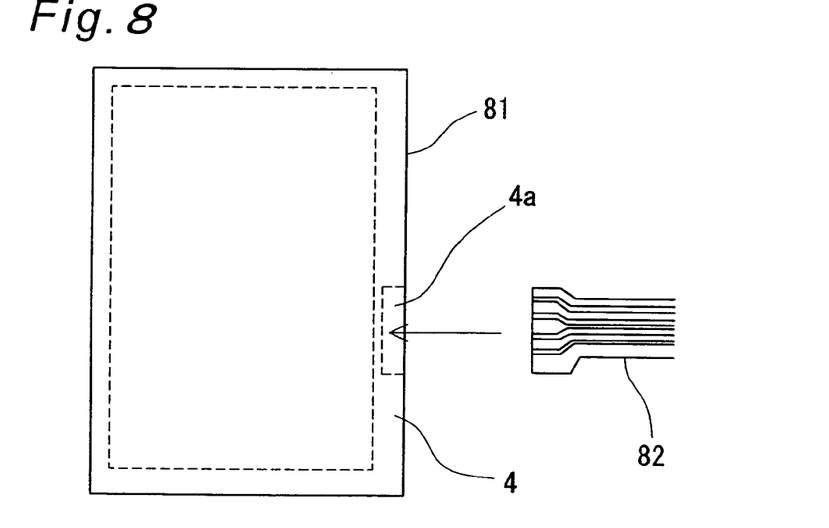
FIG. 8 is a view illustrating the mounting of a connector of the touch panel.

Further, referring to FIG. 8, the touch panel main body 81 is connected to external circuits through a connector 82 and routing lines are provided between the aforementioned transparent electrodes and the input/output terminals of the touch panel. The routing lines may be generally formed from: metal such as gold, silver, copper, nickel, or the like; a conductive paste made of carbon, or the like, by printing methods such as screen printing, offset printing, gravure printing, or flexographic printing; or brush coating methods. However, the method is not limited thereto and may be any method which can establish an electrical conduction between the connector 82 and the transparent electrodes. Band-shaped electrodes (referred to as bus bars) are formed at the connecting portions between the transparent electrodes and the routing lines, namely at opposing two sides of the transparent electrodes in the case of an analog-type touch panel or at shorter sides of the respective strap-shaped patterns in the case of a digital-type touch panel. The band-shaped electrodes may be formed from the same material as that of the routing lines by the same forming means as that for the routing lines.

Generally, there exist spacers between the upper electrode member 1 and the lower electrode member 2. The spacers are generally formed to be frame shapes, etc. It is possible to use, as the spacers, resin films similar to the transparent insulation base materials, printed layers, or coated layers made of proper resins such as acrylic-based resins, epoxy-based resins, or silicon-based resins. Generally, the spacers are served as a frame-shaped double-sided tape 4 for securing the upper electrode member 1 and the lower electrode member 2 and the adhesive layer made of an adhesive agent or a cohesive agent, in many cases. For forming an adhesive layer made of an adhesive or cohesive agent, screen printing or the like is utilized.

Further, when a large-size touch panel is formed, in order to secure the space between the transparent electrodes of the upper electrode member 1 and the lower electrode member 2, dot-shaped spacers 3 are formed on the surface of any one of the transparent electrodes (see FIG. 1). However, when the touch panel is small-sized, they can be omitted. The dot-shaped spacers 3 may be provided by forming minute dots from an acrylate resin such as melamine acrylate resin, urethan acrylate resin, epoxy acrylate resin, methacryl acrylate resin, or acrylic acrylate resin, or by forming photo-curing resin such as polyvinylalcohol resin into minute dots by photo processes. Also, the spacers may be provided by forming a plurality of minute dots by a printing method. Also, the spacers may be provided by spraying or coating dispersion liquid including particles made of inorganic substances or organic substances and then drying the same.

Although the touch panel 8 illustrated in FIG. 1 has been described hereinbefore, the structure of the touch panel according to the present invention is not limited to that according to the aforementioned first embodiment.

Figure 2:
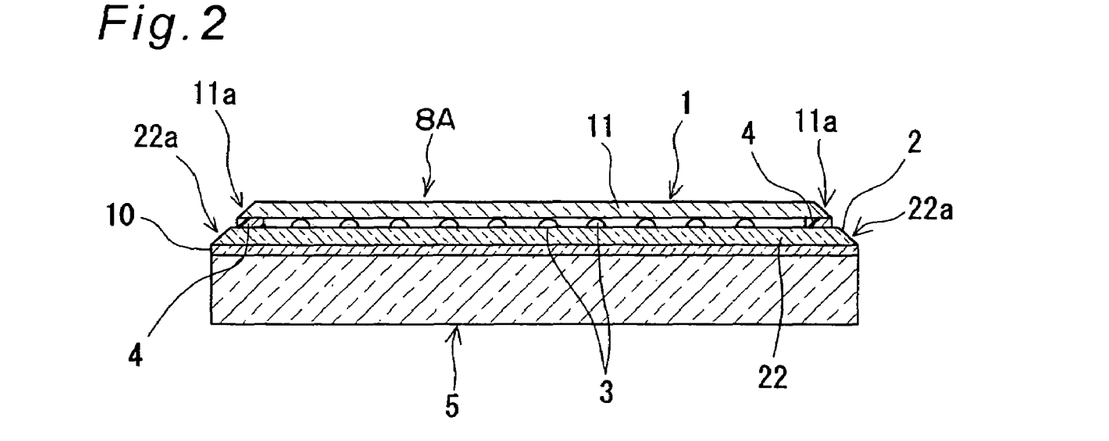
FIG. 2 is a cross sectional view illustrating a touch panel having a film/film structure according to a second embodiment of the present invention.

For example, a touch panel 8A illustrated in FIG. 2 is a touch panel having a film/film structure according to a second embodiment of the present invention including an upper electrode member 1 including a transparent electrode on the lower surface of a transparent insulation film 11, a lower electrode member 2 including a transparent electrode on the upper surface of a transparent insulation film 22, and a glass plate (transparent supporting plate) 5 adhered to the entire lower surface of the lower electrode member 2 with a transparent cohesive layer 10, wherein the transparent insulation film 11 of the aforementioned upper electrode member 1 and the transparent insulation film 22 of the aforementioned lower electrode member 2 have upwardly-inclined end surfaces 11*a*, 22*a*, respectively, at their entire peripheral sides. Further, the transparent insulation film 11 of the aforementioned upper electrode member 1 is placed on only the transparent insulation film 22 of the aforementioned lower electrode member 2, namely the transparent insulation film 11 of the aforementioned upper electrode member 1 is placed on the upper surface of the transparent insulation film 22 of the aforementioned lower electrode member 2 other than the inclined end surfaces 22a.

As the transparent insulation film 22 used in the lower electrode member 2, similar to the transparent insulation film 11 of the upper electrode member 1, it is possible to use a film made of: an engineering plastic such as polycarbonate-based plastic, polyamide-based plastic, polyetherketone-based plastic, or the like; or made of acrylic-based resin, a polyethylene-terephthalate-based resin, polybutylene-terephthalate-based resin, or the like. Further, the transparent insulation film 22 may be a laminated-layer member consisting of plural laminated films, instead of a single film.

The glass plate (transparent supporting plate) 5 adhered to the entire lower surface of the lower electrode member 2 may be made of soda glass, borosilicate glass, toughened glass, or the like.

Since the touch panel 8A having the film/film structure is constructed as described above, similar to the touch panel 8 having the film/glass structure according to the first embodiment of the present invention, even when a finger is obliquely pressed against end surfaces 11a and 22a of the transparent insulation film 11 and the transparent insulation film 22 of the touch panel 8A during handling operations of the touch panel 8A, the upper portions of these end surfaces will not be significantly compressed. Consequently, the lower portions of the end surfaces of the transparent insulation film 11 and the transparent insulation film 22 will not be floated, thus preventing peel-off.

Further, the cohesive agent 4 will not be compressed and therefore will not be extruded outwardly from between the upper electrode member 1 and the lower electrode member 2, which prevents the cohesive agent 4 from being adhered to the finger, a pressing tool, or a robot hand. This eliminates the risk of transfer thereof to the surface or the back surface of the touch panel 8A. This can prevent degradation of the viewability and the input characteristics due to extruded cohesive agent 4 and also can prevent an increase of the difficulty of separating the chuck of a robot hand from the touch panel 8 due to the extruded cohesive agent 4, which can prevent the touch panel 8A from accidentally falling onto the floor, etc., resulting in fractures of the touch panel 8. Furthermore, this can prevent the touch panel 8A from being completely transferred to the finger, the pressing tool, or the like due to extruded cohesive agent 4, preventing occurrences of Newton's rings and operational malfunctions.

Further, even if the touch panel 8A is nearly butted against a shelf 7a of a rack 7 only at end surfaces of the transparent insulation film 11 and the transparent insulation film 22 during the storage of the touch panel 8A in the rack 7, similar to the touch panel 8 having the film/glass structure according to the aforementioned first embodiment of the present invention, the entire touch panel 8A is flowed obliquely downward and forward along the aforementioned inclined end surfaces 11a and 22a, thus being prevented from butting thereto. This can prevent only the transparent insulation film 11 and the transparent insulation film 22 from being halted outside the insertion opening, which prevents the peel-off.

Further, even when touch panels 8A are successively stored in respective stages of the rack 7 using a mechanism, the end surfaces of the transparent insulation film 11 and the transparent insulation film 22 are prevented from butting against the shelves 7a of the rack as previously described, which reduces the number of times that the mechanism is stopped.

Further, it is preferable that the aforementioned inclined end surfaces 11a and 22a, in the touch panel 8A having the film/film structure, are formed to be cut planes of the transparent insulation film 11 and the transparent insulation film 22 and the acute angle θ (inclination angles θ) formed between normal lines to the inclined surfaces 11a and 22a and a vertical line is within the range of 35 to 75 degrees, for the same reasons for the touch panel 8 having the film/glass structure according to the first embodiment of the present invention. A more preferable range of the inclination angle θ of the inclined end surfaces is from 40 to 70 degrees, for the same reasons for the aforementioned case. Further, the aforementioned inclined end surfaces 11a and 22a are not limited to flat surfaces and include non-flat surfaces having a tendency of exhibiting the inclination angle θ in all.

The components of the touch panel 8A having the film/film structure according to the second embodiment of the present invention other than the transparent insulation film 22 of the aforementioned lower electrode member 2, the cohesive layer 10, and the glass plate (transparent supporting plate) 5 are similar to those of the aforementioned touch panel having the film/glass structure.

More preferably, the touch panels according to the present invention include recessed portions (glass-plate exposed portions) 9 adjacent to the end portions of the film materials. Specifically, the touch panel 8 having the film/glass structure according to the aforementioned first embodiment of the present invention is constructed such that the transparent insulation film 11 of the aforementioned upper electrode member 1 is inwardly recessed with respect to the glass plate 21 of the aforementioned lower electrode member 2 at the entire peripheral sides to form the recessed portions (glass-plate exposed portions) 9 (see FIG. 6). Further, the touch panel 8A, having the film/film structure according to the aforementioned second embodiment of the present invention, is constructed such that the transparent insulation film 22 of the aforementioned lower electrode member 2 is inwardly recessed with respect to the aforementioned glass plate (transparent supporting plate) 5 at the entire peripheral sides to form the recessed portions (glass-plate exposed portions) 9 (see FIG. 7). Further, in the case of the touch panel 8A having the film/film structure, even when the transparent insulation film 22 of the lower electrode member 2 is recessed, there is still maintained the relationship that the transparent insulation film 11 of the aforementioned upper electrode member 1 is placed only on the transparent insulation film 22 of the lower electrode member 2. Specifically the transparent insulation film 11 of the aforementioned upper electrode member 1 is placed on the upper surface of the transparent insulation film 22 of the lower electrode member 2 other than the inclined end surfaces 22a.

Figure 9:
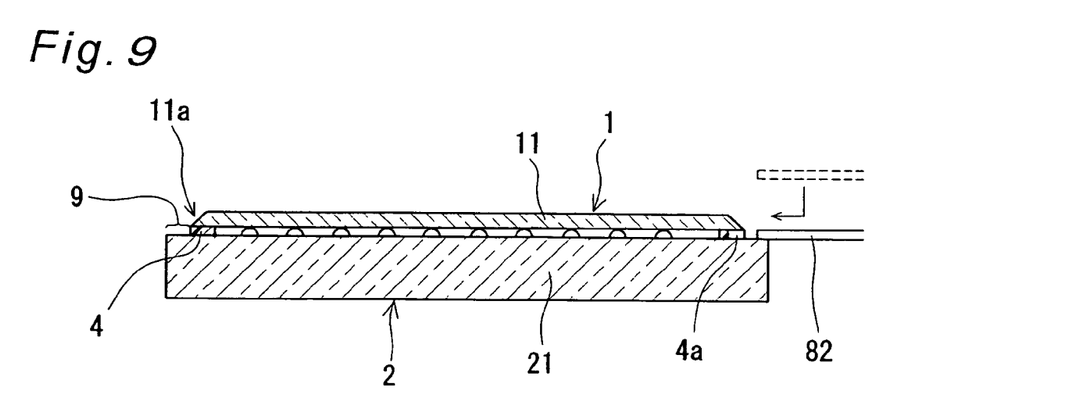
FIG. 9 is a view explaining the effects resulting from inserting the connector into the touch panel of FIG. 6.
Figure 10:
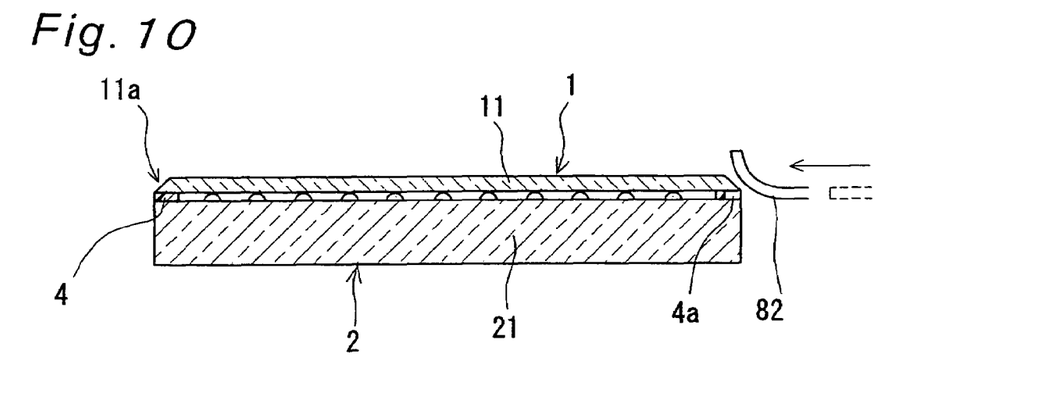
FIG. 10 is a view explaining issues caused during the insertion of the connector.
Figure 11:
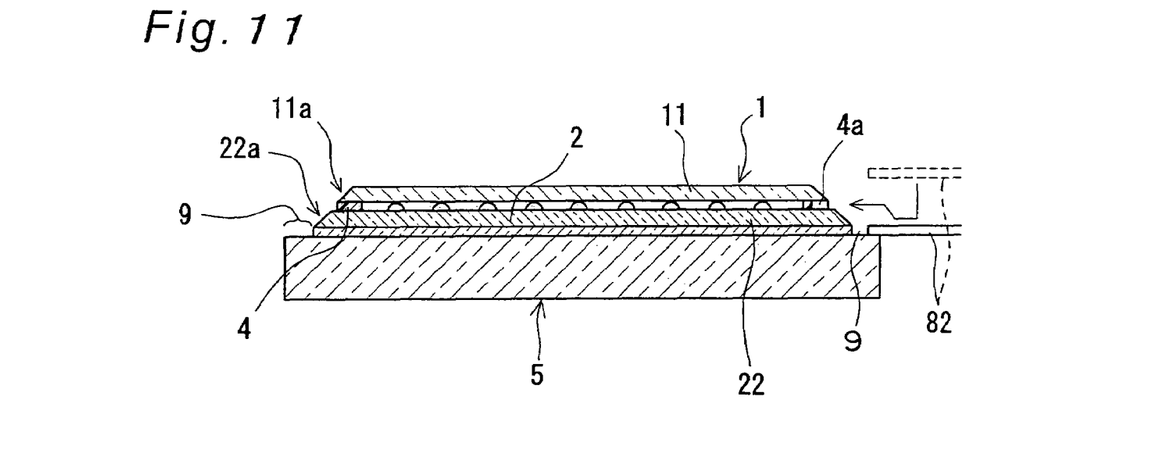
FIG. 11 is a view illustrating the effects resulting from inserting the connector into the touch panel of FIG. 7.

This structure makes it easier to mount the connector 82 to the touch panel main body 81. In general, the upper electrode member 1 and the lower electrode member 2 are attached to each other with the double-sided tape 4, etc., provided with a cutout portion 4a at the peripheral edge thereof, then the end portion of a flexible printed circuit board (FPC) is inserted between the upper electrode member 1 and the lower electrode member 2 as the connector 82 at one side of the resultant touch panel main body 81 as illustrated in FIG. 8. Further, the end portion of this flexible printed circuit plate is thermocompression-bonded thereto using an anisotropic-conductive adhesive agent by a thermocompression bonding machine. However, since there is a small gap between the upper electrode member 1 and the lower electrode member 2, inserting the aforementioned connecter 82 therebetween is like inserting a thread into a needle and therefore degrades the workability (see FIG. 10), thus resulting in degradation of the production efficiency. On the contrary, when the transparent insulation film 11 of the aforementioned upper electrode member 1 is inwardly recessed with respect to the glass plate 21 of the aforementioned lower electrode member 2 at the entire peripheral side to provide the recessed portions (glass-plate exposed portions) 9, in the touch panel 8 having the film/glass structure according to the first embodiment of the present invention, it is possible to bring the end portion of the connector 82 into contact with the recessed portion 9 provided on the upper surface of the glass plate 21 of the lower electrode member 2 and then slip it along the upper surface of the lower electrode member 2 to easily insert the end portion of the connector 82 between the upper electrode member 1 and the lower electrode member 2 (see FIG. 9). Further, when the transparent insulation film 22 of the aforementioned lower electrode member 2 is inwardly recessed with respect to the glass plate (transparent supporting plate) 5 at the entire peripheral side to provide the recessed portions (glass-plate exposed portions) 9, in the touch panel 8A having the film/film structure according to the second embodiment of the present invention, it is possible to bring the end portion of the connector 82 into contact with the recessed portion 9 provided on the upper surface of the glass plate (transparent supporting plate) 5 and then slip it along the upper surface of the glass plate (transparent supporting plate) 5 and the inclined end surface 22a of the lower electrode member 2 to easily insert the end portion of the connector 82 between the upper electrode member 1 and the lower electrode member 2 (see FIG. 11).

Figure 12:
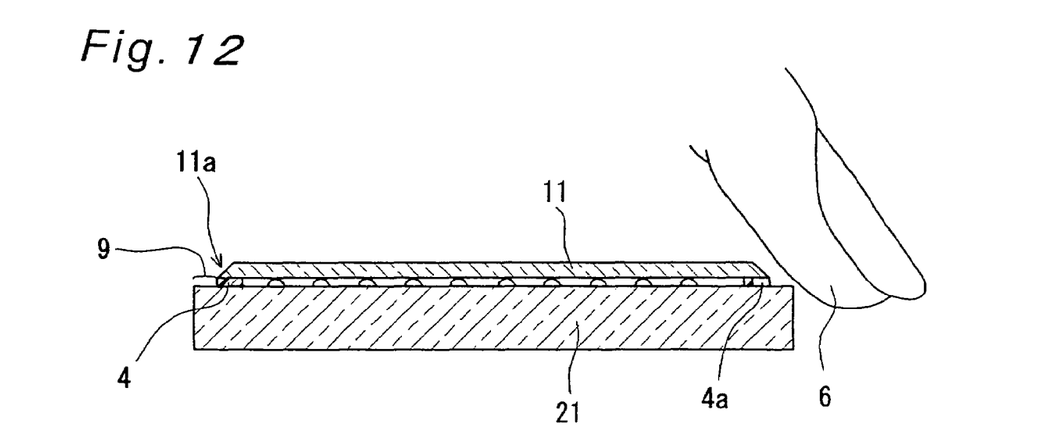
FIG. 12 is a view explaining the effects resulting from handling the touch panel of FIG. 6.

Further, by providing the recessed portions 9, it is possible to prevent fingers from contacting the end surfaces of the transparent insulation films 11 and 22 during handling operations of the touch panels, thus further facilitating prevention of peeling-off in comparison with the case of providing only the inclined end surfaces 11a, 22a (see FIG. 12).

Figure 6:
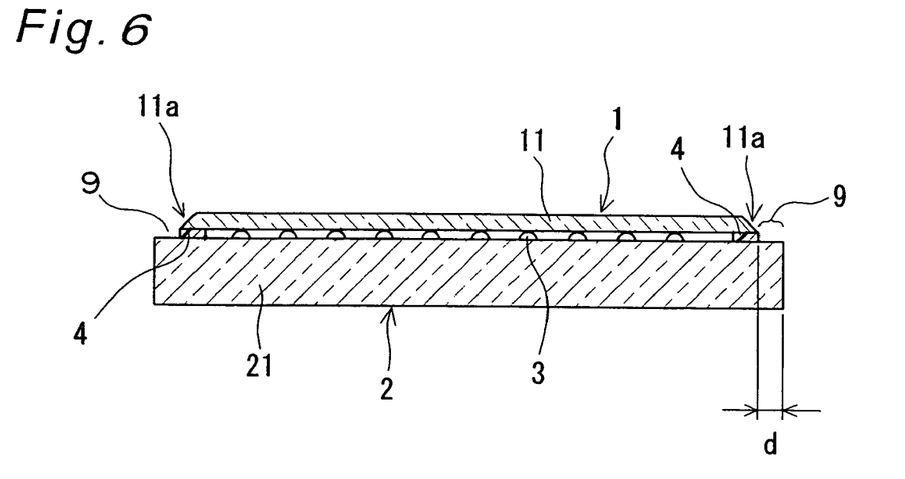
FIG. 6 is a cross sectional view illustrating a touch panel having a film/glass structure according to the first embodiment of the present invention.
Figure 7:
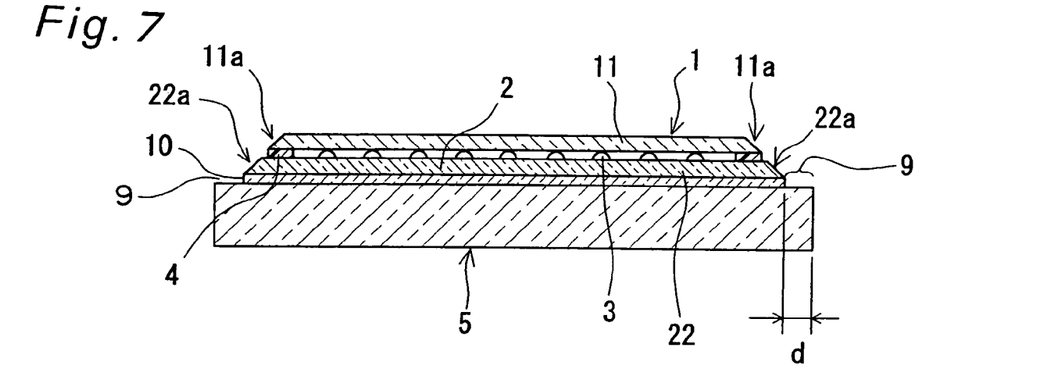
FIG. 7 is a cross sectional view illustrating a touch panel having a film/film structure according to a second embodiment of the present invention.

It is preferable that the width d of the aforementioned recessed portions 9 is within the range of 0.1 to 1.5 mm. If the width d is smaller than 0.1 mm, it is difficult to bring the end portion of the connector 82 into contact therewith. On the contrary, when the width d exceeds 1.5 mm, the area of the touch panel 8, 8A which does not electrically function is unnecessarily large, which retrogrades against the industrial trend toward smaller peripheral edge portion.

Further, while the adhesive layers (the cohesive layer 10 and the double-sided tape 4) used for (i) adhering the upper electrode member and the lower electrode member to each other and (ii) adhering the lower electrode member and the transparent supporting plate to each other, are not provided with inclined end surfaces in any of FIGS. 1 to 4, FIG. 6, FIG. 7, and FIGS. 9 to 12, they may be inclined similarly to the inclined end surfaces of the upper electrode member and the lower electrode member.

Figure 3:
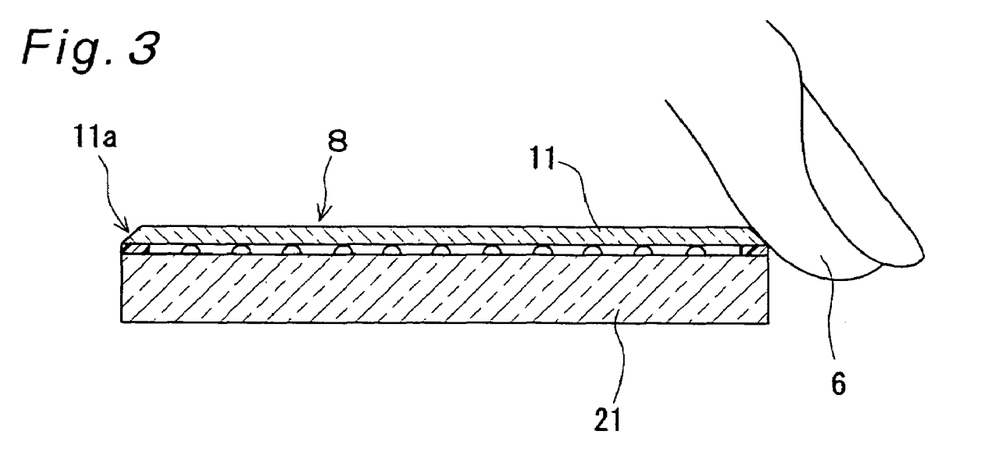
FIG. 3 is a view explaining the effects offered during handling of the touch panel of FIG. 1.
Figure 19:
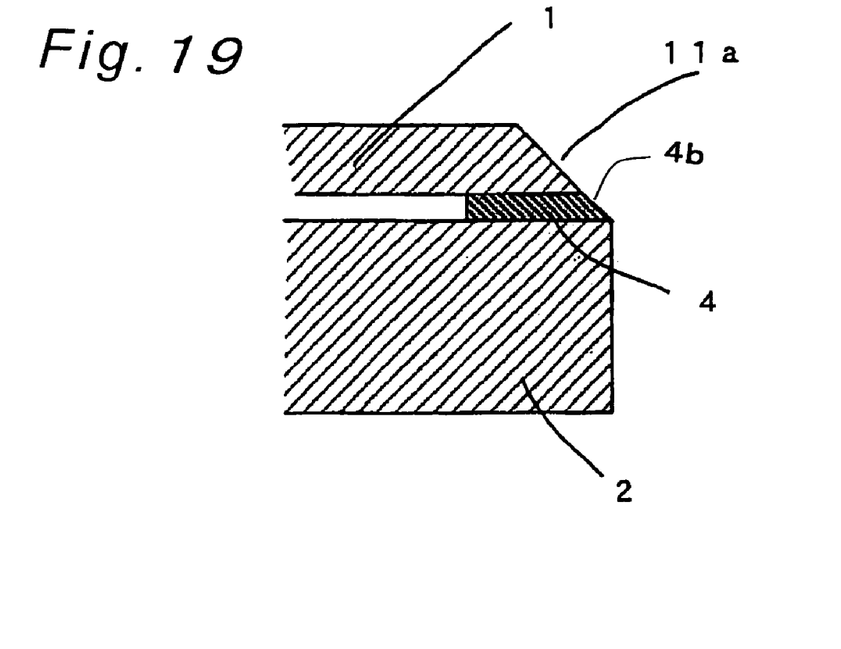
FIG. 19 is a partially-enlarged cross sectional view illustrating an example where the double-sided tape of the touch panels of FIG. 1, FIG. 3 and FIG. 4 has an inclined end surface similar to the inclined end surface of the upper electrode member.
Figure 20:
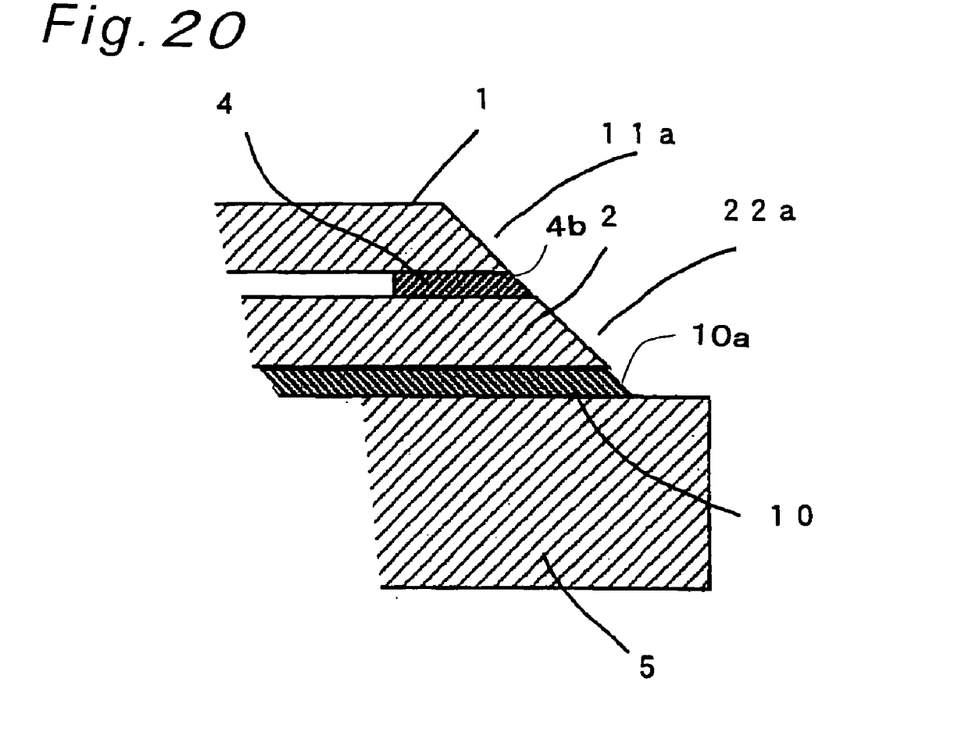
FIG. 20 is a partially-enlarged cross sectional view illustrating an example where the double-sided tape and the cohesive layer of the touch panel of FIG. 2 have inclined end surfaces, similar to the inclined end surface of the upper electrode member and the inclined end surface of the lower electrode member.
Figure 21:
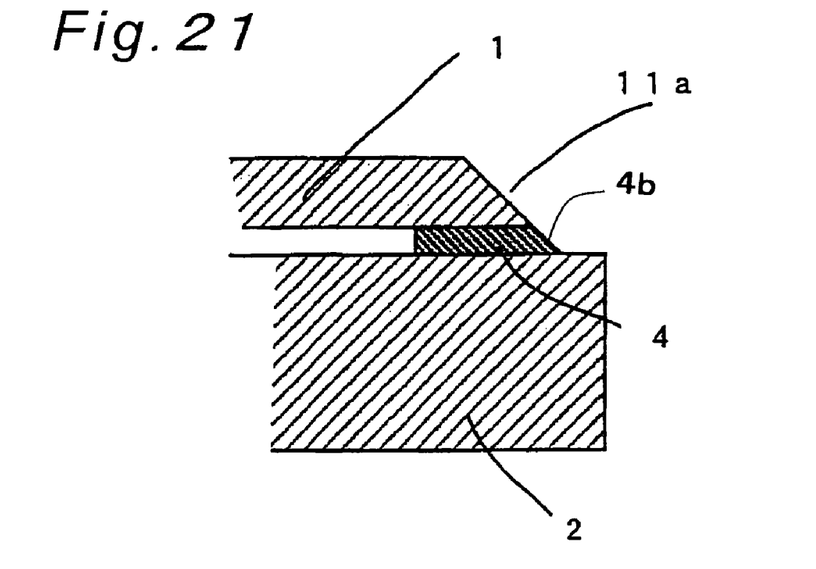
FIG. 21 is a partially-enlarged cross sectional view illustrating an example where the double-sided tape of the touch panel of FIG. 6 has an inclined end surface, similar to the inclined end surface of the upper electrode member.
Figure 22:
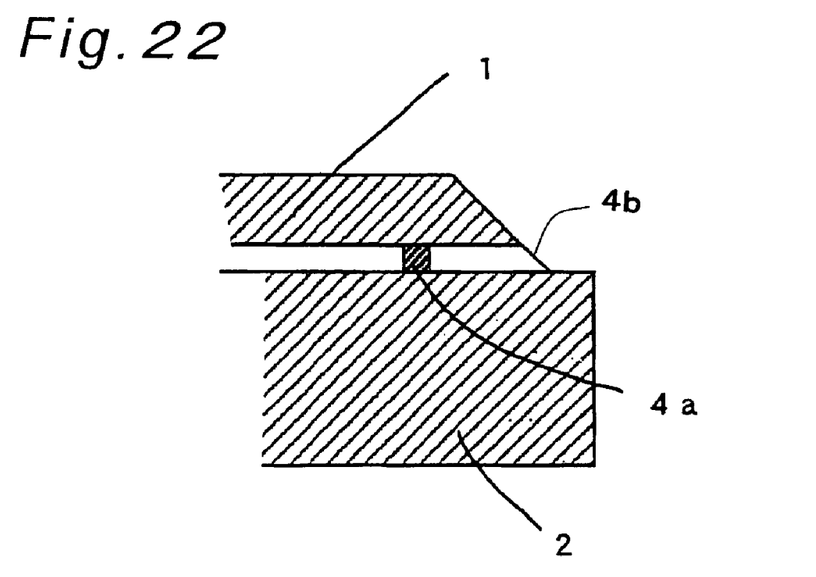
FIG. 22 is a partially-enlarged cross sectional view illustrating an example where the double-sided tape of the touch panel of FIG. 9 and FIG. 12 has an inclined end surface, similar to the inclined end surface of the upper electrode member.
Figure 23:
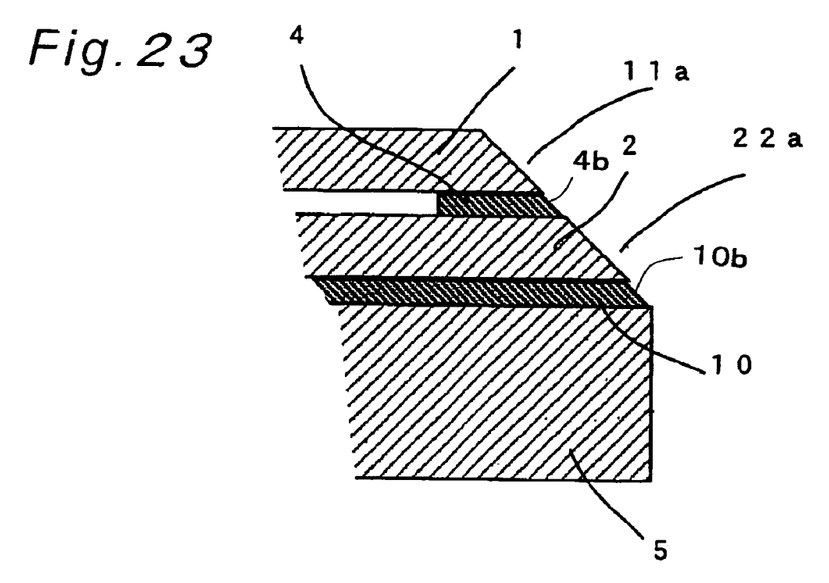
FIG. 23 is a partially-enlarged cross sectional view illustrating an example where the double-sided tape and the cohesive layer of the touch panel of FIG. 7 have inclined end surfaces, similar to the inclined end surface of the upper electrode member and the inclined end surface of the lower electrode member.
Figure 24:
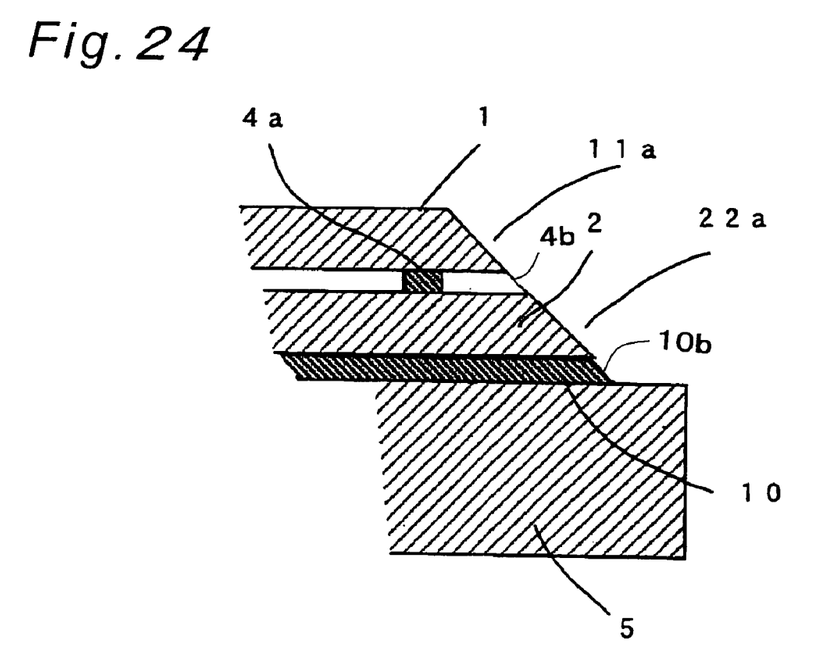
FIG. 24 is a partially-enlarged cross sectional view illustrating an example where the double-sided tape and the cohesive layer of the touch panel of FIG. 11 have inclined end surfaces, similar to the inclined end surface of the upper electrode member and the inclined end surface of the lower electrode member.

FIG. 19 illustrates an example where the double-sided tape 4 of the touch panel of FIG. 1, FIG. 3, and FIG. 4 has an inclined end surface 4b similar to the inclined end surface 11a of the upper electrode member 1. FIG. 20 illustrates an example where the double-sided tape 4 and the cohesive layer 10 of the touch panel of FIG. 2 have inclined end surfaces 4b and 10a similar to the inclined end surface 11a of the upper electrode member 1 and the inclined end surface 22a of the lower electrode member 2. FIG. 21 illustrates an example where the double-sided tape 4 of the touch panel of FIG. 6 has an inclined end surface 4b similarly to the inclined end surface 11a of the upper electrode member 1. FIG. 22 illustrates an example where the double-sided tape 4 of the touch panel of FIG. 9 and FIG. 12 has an inclined end surface 4b similar to the inclined end surface 11a of the upper electrode member 1. FIG. 23 illustrates an example where the double-sided tape 4 and the cohesive layer 10 of the touch panel of FIG. 7 have inclined end surfaces 4b and 10b similar to the inclined end surface 11a of the upper electrode member 1 and the inclined end surface 22a of the lower electrode member 2. FIG. 24 illustrates an example where the double-sided tape 4 and the cohesive layer 10 of the touch panel of FIG. 11 have inclined end surfaces 4b and 10b similar to the inclined end surface 11a of the upper electrode member 1 and the inclined end surface 22a of the lower electrode member 2. When the double-sided tape 4 and/or the cohesive layer 10 have inclined end surfaces 4b and/or 10b similar to the inclined end surface 11a of the upper electrode member 1 and/or the inclined end surface 22a of the lower electrode member 2 as described above, it is possible to more effectively offer the effects preventing peeling-off of the transparent insulation films during handling operations or storage in the rack and reducing the number of times that the mechanism is stopped during storage in the rack with the mechanism, according to the present invention. Further, when the touch panel is constructed such that the touch panel has inclined end surfaces 11a and/or 22a at the entire peripheral edge thereof and further when it is constructed such that the touch panel has inclined end surfaces 4b and/or 10b in addition to inclined end surfaces 11a and/or 22a, it is possible to more certainly offer the effects of the present invention at the entire peripheral edge of the touch panel. Further, even if an inclined end surface of an adhesive layer exists within the aforementioned recessed portion 9 as a result, the adhesive layer will not obstruct the end portion of the connector 82 being brought into contact with the recessed portion 9 provided on the upper surface of the glass plate 21, 5 since the adhesive layer is flexible in comparison with the upper electrode member 1 and the lower electrode member 2.

Figure 18:
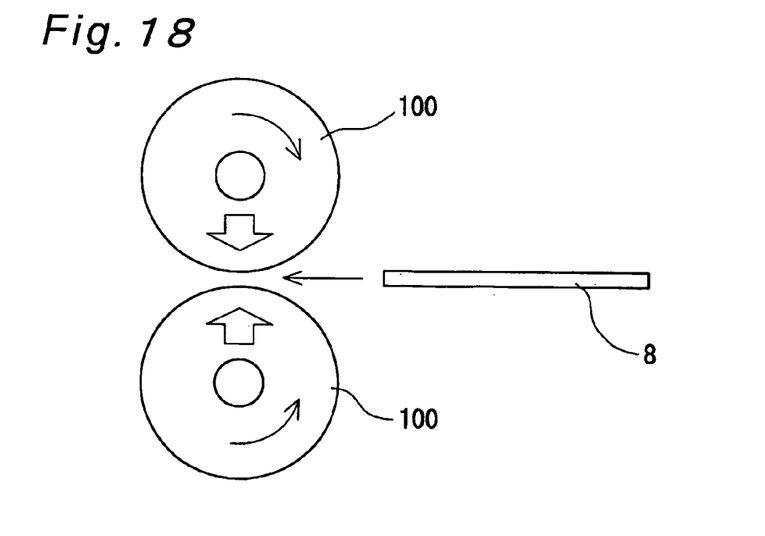
FIG. 18 is a view illustrating an example of removal of dusts adhered to the touch panel.

Further, when the adhesive layers (the cohesive layer 10 and the double-sided tape 4) used for adhering the upper electrode member and the lower electrode member and for adhering the lower electrode member and the transparent supporting plate are inclined at their end surfaces, similar to the inclined end surfaces of the upper electrode member and the lower electrode member, it is possible to offer the advantage that dust adhered firmly to the end surfaces of the adhesive layers due to the adherence thereof can be eliminated as well as dust adhered to the surface and the back surface of the touch panel 8, by passing the touch panel 8 between the rollers of dust-eliminating rollers 100 (see FIG. 18). Since the adhesive layers are inclined at their end surfaces as previously described, the end surfaces of the adhesive layers can be brought into contact with the rollers during the insertion thereof between the rollers. Further, it is possible to eliminate dust adhered to the inclined end surfaces of the film for the same reason.

Working Example 1

A PET film having a thickness of 185 micrometers and having upwardly-inclined end surfaces (with an inclination angle of 60 degrees) at its entire peripheral sides was employed. An ITO film having a thickness of 15 nm was formed on the upper surface thereof by sputtering and then the peripheral edge portion of the ITO film was eliminated to form a transparent electrode. Subsequently, bus bars at two parallel sides of the transparent electrode and routing lines were formed using a silver paste by screen printing to provide an upper electrode member.

Further, a lower electrode member was provided using a soda glass plate having a thickness of 0.7 mm, with a similar manner to that of the upper electrode member. Then, both the electrode members were oppositely placed with an air layer interposed between the transparent electrodes and attached to each other at their peripheral edge portions with a double-sided tape having a cutout portion to provide a touch panel main body (the respective layers have a lengthwise dimension of 50 mm and a widthwise dimension of 40 mm). Finally, the end portion of a flexible printed circuit board (FPC) was inserted into the cutout portion of the aforementioned double-sided tape of the touch panel main body as a connector and then it was thermocompression-bonded thereto using an anisotropic-conductive adhesive agent by a thermocompression bonding machine to provide a touch panel having a film/glass structure.

Working Example 2

A PET film having a thickness of 185 micrometers and having upwardly-inclined end surfaces (with an inclination angle of 60 degrees) at its entire peripheral sides was employed. An ITO film having a thickness of 15 nm was formed on the upper surface thereof by sputtering and then the peripheral edge portion of the ITO film was eliminated to form a transparent electrode. Subsequently, bus bars at two parallel sides of the transparent electrode and routing lines were formed using a silver paste by screen printing to provide an upper electrode member. Further, a lower electrode member was provided using a PET film having a thickness of 125 micrometers and having upwardly-inclined end surfaces (with an inclination angle of 60 degrees) at its entire peripheral side, with a similar manner to that of the upper electrode member. Then, both the electrode members were oppositely placed with an air layer interposed between the transparent electrodes, such that the transparent insulation film of the aforementioned upper electrode member was placed only on the transparent insulation film of the aforementioned lower electrode member, and attached to each other at their peripheral edge portions with a double-sided tape having a cutout portion. Further, a soda glass plate having a thickness of 0.7 mm as a transparent supporting plate was adhered to the entire lower surface of the lower electrode member with a cohesive agent to provide a touch panel main body (the respective layers have a lengthwise dimension of 50 mm and a widthwise dimension of 40 mm). Finally, the end portion of a flexible printed circuit board (FPC) was inserted into the cutout portion of the aforementioned double-sided tape of the touch panel main body as a connector and then it was thermocompression-bonded thereto using an anisotropic-conductive adhesive agent by a thermocompression bonding machine to provide a touch panel having a film/film structure.

Working Example 3

Working Example 3 was similar to Working Example 1 except that the transparent insulation film of the aforementioned upper electrode member was formed to have smaller lengthwise and widthwise dimensions, namely lengthwise dimension of 49.85 mm and a widthwise dimension of 39.85 mm, so that the transparent insulation film of the aforementioned upper electrode member was inwardly recessed by 0.15 mm with respect to the glass plate of the lower electrode member at the entire peripheral sides to provide recessed portions.

Working Example 4)

Working Example 4 was similar to Working Example 2 except that the transparent insulation film of the aforementioned lower electrode member was formed to have smaller lengthwise and widthwise dimensions, namely lengthwise dimension of 49.85 mm and a widthwise dimension of 39.85 mm, so that the transparent insulation film of the aforementioned lower electrode member was inwardly recessed by 0.15 mm with respect to the transparent supporting plate made of the glass plate at the entire peripheral sides to provide recessed portions.

In the touch panels according to the aforementioned Working Examples 1 to 4, the transparent insulation film had upwardly-inclined end surfaces, and therefore peeling-off of the transparent insulation film did not occur during handling operations and during storage in a rack. Also, the mechanism was stopped a reduced number of times during the storage in the rack using the mechanism. Further, in Working Example 3 and Working Example 4, the film materials were inwardly recessed to provide the recessed portions, which improved the workability of the insertion of the connector and also enhanced the effect of preventing peeling-off during handling operations.

Since the touch panels according to the present invention have the aforementioned structures and the aforementioned effects, the following advantages can be provided.

Namely, since the transparent insulation film of the upper electrode member has upwardly-inclined end surfaces at the entire peripheral sides in the touch panel, having the film/glass structure, according to the present invention, even if a finger is obliquely pressed against an end surface of the transparent insulation film of the touch panel during handling operations of the touch panel, the upper portion of the end surface of the transparent insulation film will not be significantly compressed. Consequently, the lower portion of the end surface of the transparent insulation film will not be floated, thus preventing peel-off.

Further, the cohesive agent will not be compressed and therefore will not be extruded outwardly from between the upper electrode member and the lower electrode member, which can prevent the cohesive agent from adhering to the finger, a pressing tool, or a robot hand. Thus, eliminating the risk of transfer thereof to the surface or the back surface of the touch panel. This can also prevent degradation of the viewability and the input characteristics due to extruded cohesive agent and also can prevent increases of the difficulty of separating the chuck of the robot hand from the touch panel due to extruded cohesive agent, which can prevent the touch panel from being accidentally fallen on the floor, etc., resulting in fractures of the touch panel. Furthermore, this can prevent the touch panel from being completely transferred to the finger, the pressing tool, or the like due to extruded cohesive agent. Thus, preventing occurrences of Newton's rings and operational malfunctions.

Further, since the transparent insulation film of the upper electrode member has the upwardly-inclined end surfaces at the entire peripheral sides thereof in the touch panel having the film/glass structure according to the present invention, even if the touch panel is nearly butted against a shelf of a rack only at an end surface of the transparent insulation film during storing of the touch panel into the rack, the entire touch panel is flowed obliquely downward and forward along the aforementioned inclined end surface, thus being prevented from butting thereto. This can prevent only the transparent insulation film from being halted outside the insertion opening, which prevents peel-off.

Further, even when touch panels are successively stored into respective stages of the rack using a mechanism, the end surfaces of the transparent insulation films are prevented from butting against the shelves of the rack as previously described, which reduces the number of times that the mechanism is stopped.

Further, in the touch panel having the film/film structure according to the present invention, since the transparent insulation film of the upper electrode member and the transparent insulation film of the lower electrode member have upwardly-inclined end surfaces at the entire peripheral sides and further the transparent insulation film of the upper electrode member is placed only on the transparent insulation film of the lower electrode member, namely the transparent insulation film of the upper electrode member is placed on the upper surface of the transparent insulation film of the lower electrode member other than the inclined end surfaces thereof, it is possible to offer effects similar to those of the touch panel having the aforementioned film/glass structure according to the present invention.

By properly combining the arbitrary embodiments of the aforementioned various embodiments, the effects possessed by the embodiments can be produced.

Although the present invention has been fully described in connection with the preferred embodiments thereof, with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. The invention claimed is a touch panel comprising:
an upper electrode member including a transparent insulation film having an upper transparent electrode located on a lower surface thereof;
a lower electrode member including a glass plate having a lower transparent electrode (i) located on an upper surface thereof and (ii) having an upper surface opposing a lower surface of the upper transparent electrode; and
a plurality of transparent spacers disposed between the lower surface of the upper transparent electrode and the opposing upper surface of the lower transparent electrode,
wherein each peripheral edge of the upper electrode member is adhered to a respective corresponding peripheral edge of the lower electrode member, and
wherein an entire end surface, of each peripheral edge of the upper electrode member adhered to a respective corresponding peripheral edge of the lower electrode member, is an inclined end surface inwardly inclined from a lower surface of the upper electrode member toward an upper surface of the upper electrode member.

2. The invention claimed is a touch panel according to claim 1, wherein the entire end surface of at least one peripheral edge of the upper electrode member is inwardly recessed with respect to an entire corresponding end surface of a respective corresponding peripheral edge of the lower electrode member to form a recessed portion.

3. The invention claimed is a touch panel according to claim 2, wherein a width of the recessed portion ranges between 0.1 to 1.5 mm, the width being measured from the corresponding end surface of the respective corresponding peripheral edge of the lower electrode member to an outermost end surface of the at least one peripheral edge of the upper electrode member.

4. The invention claimed is a touch panel according to claim 1, wherein an acute angle θ formed between a normal line to each inclined end surface and the lower surface of the upper electrode member is within a range of 35 to 75 degrees.

5. The invention claimed is a touch panel comprising:
an upper electrode member including an upper transparent insulation film having an upper transparent electrode located on a lower surface thereof;
a lower electrode member including a lower transparent insulation film having a lower transparent electrode (i) located on an upper surface thereof and (ii) having an upper surface opposing a lower surface of the upper transparent electrode;
a transparent supporting glass plate adhered to an entire lower surface of the lower electrode member; and
a plurality of transparent spacers disposed between the lower surface of the upper transparent electrode and the opposing upper surface of the lower transparent electrode,
wherein each peripheral edge of the upper electrode member is adhered to a respective corresponding peripheral edge of the lower electrode member,
wherein (i) an entire end surface of each peripheral edge of the upper electrode member adhered to a respective corresponding peripheral edge of the lower electrode member and (ii) an entire end surface of each respective corresponding peripheral edge of the lower electrode member adhered to a peripheral edge of the upper electrode member, are inclined end surfaces inwardly inclined from a lower surface of the upper electrode member and a lower surface of the lower electrode member towards an upper surface of the upper electrode member and an upper surface of the lower electrode member, respectively, and
wherein the upper electrode member is placed on the upper surface of the lower electrode member at a location other than the inclined end surfaces.

6. The invention claimed is a touch panel according to claim 5, wherein the entire end surface of at least one peripheral edge of the lower electrode member is inwardly recessed with respect to an entire corresponding end surface of a respective corresponding peripheral edge of the transparent supporting glass plate to form a recessed portion.

7. The invention claimed is a touch panel according to claim 6, wherein a width of the recessed portion ranges between 0.1 to 1.5 mm, the width being measured from the corresponding end surface of the respective corresponding peripheral edge of the transparent supporting glass plate to an outermost end surface of the at least one peripheral edge of the lower electrode member.

8. The invention claimed is a touch panel according to claim 5, wherein an acute angle θ formed between (i) a normal line to each inclined end surface of the upper electrode member and the lower surface of the upper electrode member and (ii) a normal line to each inclined end surface of the lower electrode member and the lower surface of the lower electrode member, is within a range of 35 to 75 degrees.

* * * * *